US008036309B2

(12) United States Patent
Golitschek Edler Von Elbwart et al.

(10) Patent No.: US 8,036,309 B2
(45) Date of Patent: Oct. 11, 2011

(54) METHOD AND TRANSMITTER STRUCTURE REDUCING AMBIGUITY BY REPETITION REARRANGEMENT IN THE SYMBOL DOMAIN

(75) Inventors: Alexander Golitschek Edler Von Elbwart, Darmstadt (DE); Christian Wengerter, Kleinheubach (DE); Isamu Yoshii, Frankfurt (DE)

(73) Assignee: Panasonic Corporation, Osaka (JP)

( * ) Notice: Subject to any disclaimer, the term of this patent is extended or adjusted under 35 U.S.C. 154(b) by 1021 days.

(21) Appl. No.: 11/718,468

(22) PCT Filed: Jul. 20, 2005

(86) PCT No.: PCT/EP2005/007929
§ 371 (c)(1),
(2), (4) Date: Oct. 24, 2007

(87) PCT Pub. No.: WO2006/048060
PCT Pub. Date: May 11, 2006

(65) Prior Publication Data
US 2008/0279308 A1 Nov. 13, 2008

(30) Foreign Application Priority Data
Nov. 3, 2004 (EP) .................................. 04026082

(51) Int. Cl.
H04L 27/20 (2006.01)
(52) U.S. Cl. ........................................ 375/308; 375/295
(58) Field of Classification Search .................. 375/308, 375/295
See application file for complete search history.

(56) References Cited

U.S. PATENT DOCUMENTS
2002/0114270 A1* 8/2002 Pierzga et al. ................. 370/208
2004/0042565 A1* 3/2004 Garrett ........................... 375/341

FOREIGN PATENT DOCUMENTS
| DE | 10156822 | 5/2003 |
| EP | 1293059 | 3/2004 |
| WO | 02067491 | 8/2002 |
| WO | 2004036817 | 4/2004 |
| WO | 2004036818 | 4/2004 |

OTHER PUBLICATIONS

International Search Report dated Oct. 14, 2005.
Morelos-Zaragoza, et al., "Multilevel Coded Modulation for Unequal Error Proection and Multistage Decoding—Part 1: Symmetric Constellations," IEEE Transactions on Communications, IEEE Inc., XP000930507, vol. 48, No. 2, pp. 204-212, Feb. 2000.
L. Lampe, et al., "Interactive Decision-Feedback Differential Demodulation of Bit-Interleaved Coded MDPSK for Flat Rayleigh Fading Channels," IEEE Transactions on Communications, vol. 49, No. 7, Jul. 2001 pp. 1176-1184.

* cited by examiner

*Primary Examiner* — Shuwang Liu
*Assistant Examiner* — Michael Neff
(74) *Attorney, Agent, or Firm* — Dickinson Wright PLLC

(57) ABSTRACT

A method is provided which improves reliability of channel estimation in a digital communication system by reducing the ambiguity in the recognition of received symbols evaluated for the channel estimation. A data word transmitted according to a first mapping of data word values to modulation states is re-transmitted at least once with a second, re-arranged mapping of data word values to modulation states. The second mapping and possible further mappings are generated from the first mapping in a way that the number of different results which can be obtained from combining the transmitted original data symbol and the re-transmitted counterpart data symbol(s) is lower than the number of original modulation states in the first mapping.

6 Claims, 15 Drawing Sheets

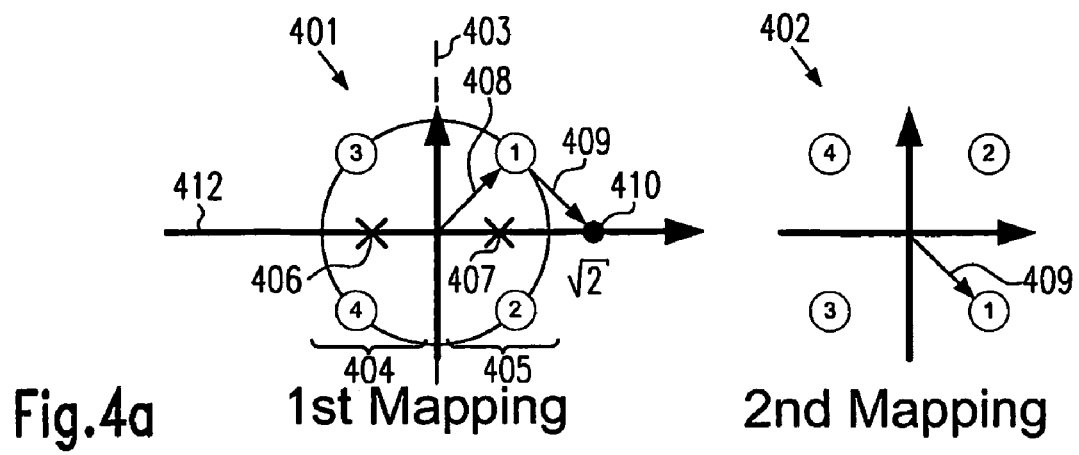
Fig.4a 1st Mapping    2nd Mapping
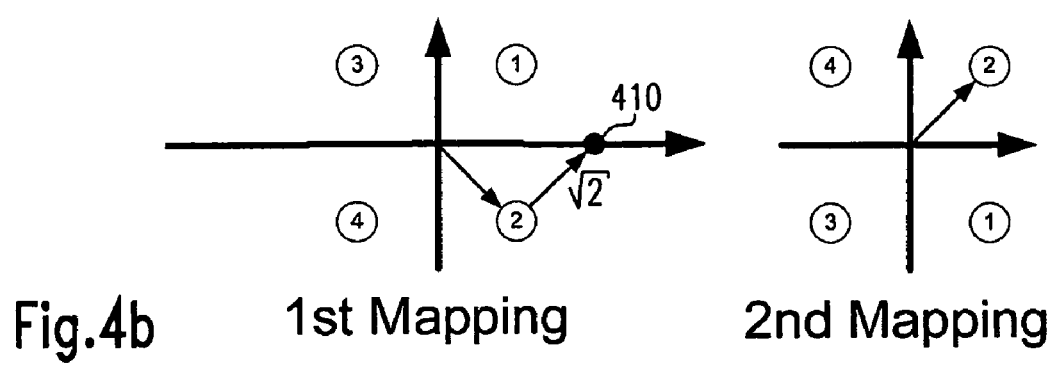
Fig.4b 1st Mapping    2nd Mapping
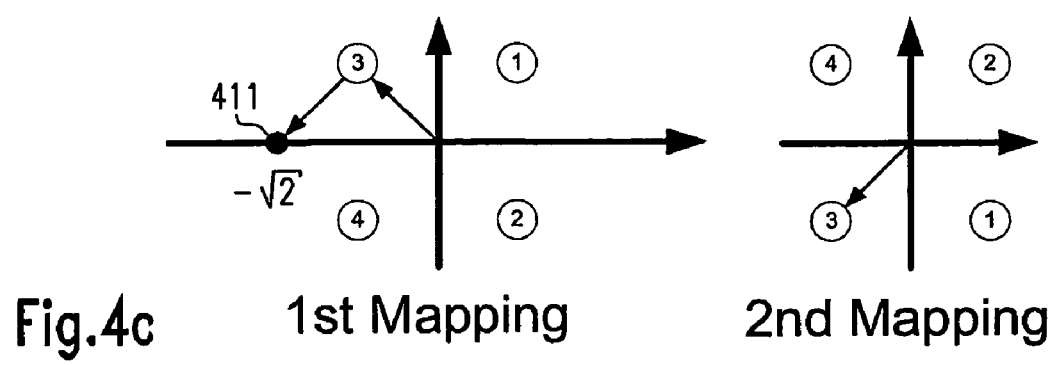
Fig.4c 1st Mapping    2nd Mapping
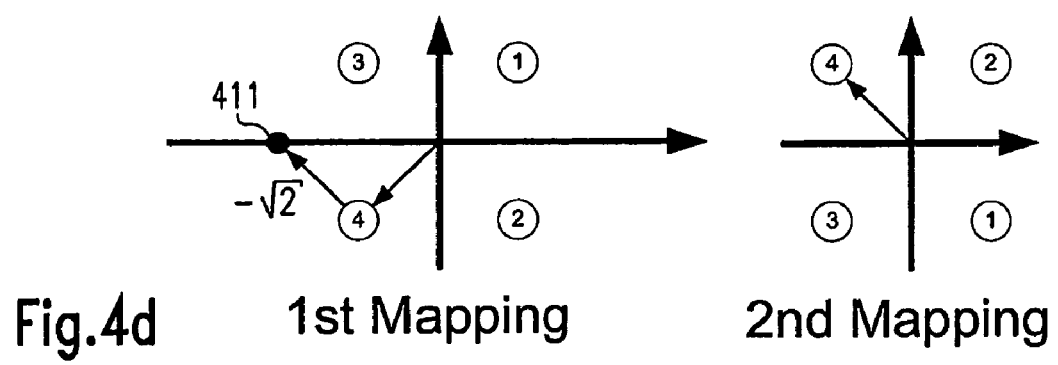
Fig.4d 1st Mapping    2nd Mapping

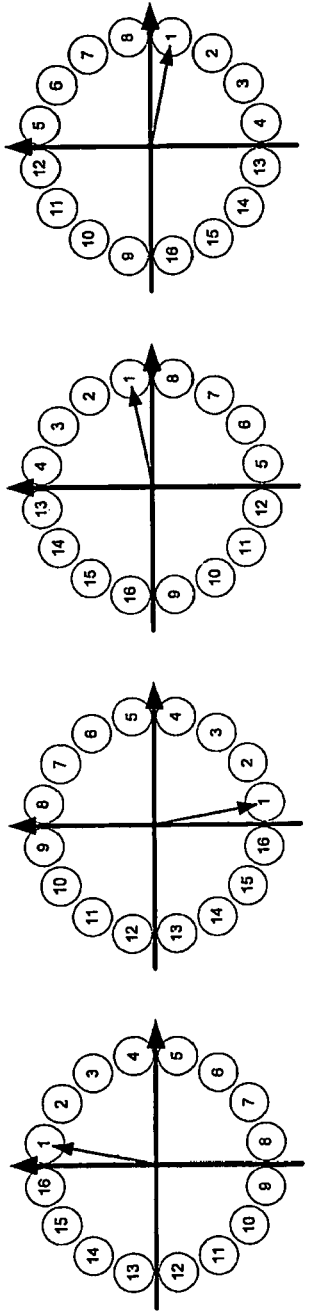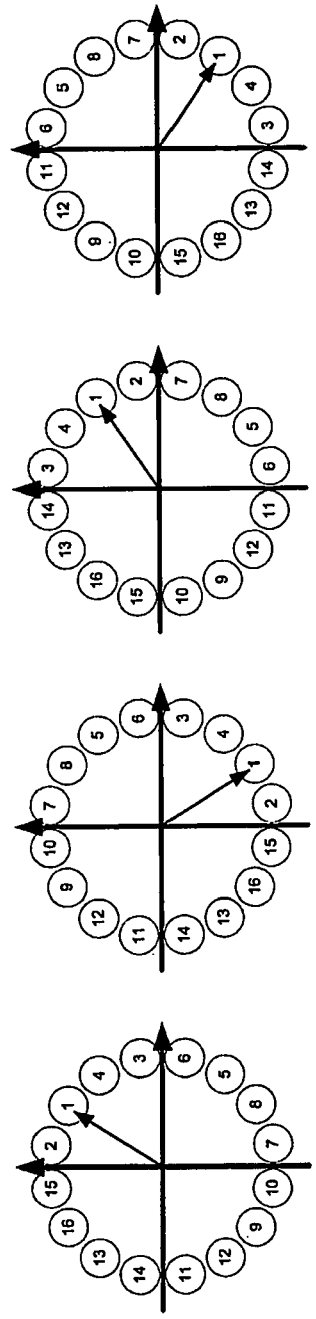
Fig.9

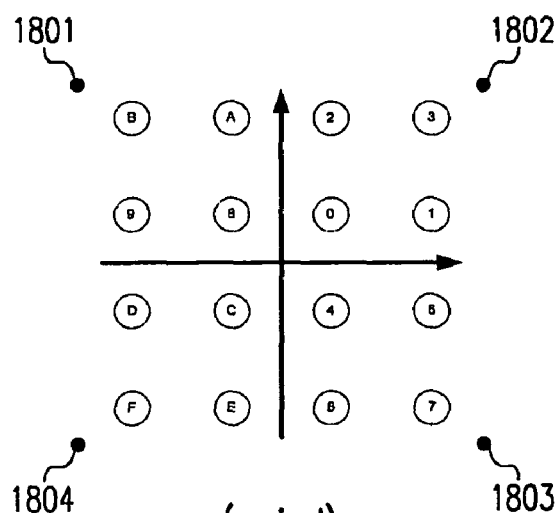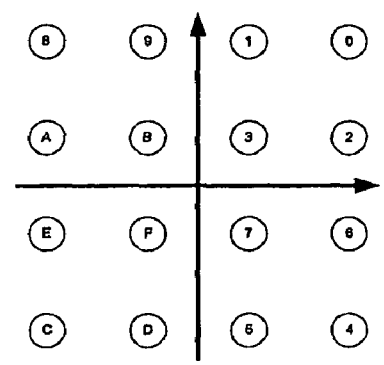
(original)
Fig.18a
(counterpart)
Fig.18b

METHOD AND TRANSMITTER STRUCTURE REDUCING AMBIGUITY BY REPETITION REARRANGEMENT IN THE SYMBOL DOMAIN

BACKGROUND OF THE INVENTION

1. Field of the Invention

The invention relates to digital communication systems. It is particularly applicable to communication systems where data is transmitted over a time-variant or frequency-variant channel, such as in mobile communication systems or satellite communication.

2. Description of the Related Art

For transmission over long distances or wireless links, digital data is modulated onto one or more carriers. Various modulation schemes are known in prior art, such as amplitude shift keying (ASK), phase shift keying (PSK) and mixed amplitude and phase modulation like quadrature amplitude modulation, QAM. In all mentioned modulation types, the modulated signal, in terms of for example voltage or field strength, can be expressed by $$u(t) = Re(A \cdot e^{j\omega t})$$

A bit sequence, or data word, is represented by a complex value A wherein $$|A| = \sqrt{(Re(A))^2 + (Im(A))^2}$$

represents the momentary amplitude of the modulated signal and $$\varphi(A) = \arctan(Im(A)/Re(A))$$

represents the momentary phase of the modulated signal. The assignment between bit sequence and complex values is called mapping. Generally a data word consisting of a b-bit bit sequence results in a mapping of $2^b$ bit sequences to $2^b$ complex values.

As real transmission channels distort the modulated signal by phase shift and attenuation, and as they add noise to the signal, errors occur in the received data after demodulation. The probability for errors usually rises with rising data rate, that is with rising number of modulation states and falling symbol duration. To cope with such errors, redundancy can be added to the data, which allows to recognise and to correct erroneous symbols. A more economic approach is given by methods which repeat only the transmission of data in which un-correctable errors have occurred, such as hybrid automatic repeat request, HARQ, and incremental redundancy.

In a basic approach to transmit repeated data in prior art, the same mapping as applied in the first transmission is re-used for re-transmission. Thus the complex value representing the repeated data word is identical to that of the original data word. This will be referred to as "Simple Mapping".

EP 1 293 059 B1 shows a method to rearrange digital modulation symbols in order to improve the mean reliabilities of all bits. This is achievable by changing the mapping rule of bits onto modulation symbols. This patent focuses on the rearrangement for retransmitted data words in an ARQ system.

WO 2004 036 817 and WO 2004 036 818 describe how to achieve the reliability averaging effect for a system where an original and a repeated data word are transmitted over different diversity branches, or in combination with an ARQ system.

The methods and mechanisms of the patent publications cited above will be referred to as "Constellation Rearrangement" or "CoRe" for simplicity.

A major difference between wired communication systems and wireless communication systems is the behaviour of the physical channel over which information is transmitted. The wireless or mobile channel is by its very nature variant over time and/or frequency. For a good performance in most modern mobile communication systems a demodulation of data symbols in a receiver requires an accurate estimation of the channel, usually measured by a channel coefficient, which includes knowledge about the power, the phase, or both properties of the channel. To facilitate this, usually some sort of pilot symbols are inserted into or between the data symbol stream which have a predetermined unambiguous amplitude and/or phase value, which can be used to determine the channel coefficient. This information is then used for correction measures like adaptive filtering.

"Decision-Feedback Demodulation" is an iterative process where a first rough channel estimate (or none at all) is used to demodulate the data symbols. After demodulation, and preferably after decoding, the obtained information is fed back to the channel estimator for an improved estimation resulting from the data symbols. It should be apparent that this process causes not only delay and requires a lot of computations in each iteration step, but it also depends greatly on the quality of the first rough channel estimate due to the feedback loop. Such procedure is known for example from Lutz H.-J. Lampe and Robert Schober, "Iterative Decision-Feedback Differential Demodulation of Bit-Interleaved Coded MDPSK for Flat Rayleigh Fading Channels" in IEEE Transactions on Communications, Volume: 49, Issue: 7, July 2001, Pages: 1176-1184.

Usually the data symbols themselves cannot be accurately used for channel estimation, since the amplitude and/or phase are not known a priori to demodulation. The receiver has to conclude on a sent symbol based on the received signal, before channel estimation is possible. As the recognition of the symbol might be erroneous, ambiguity is introduced to the channel estimation. This behaviour can be seen from FIG. 1 and is further detailed in Table 1 to show the number of ambiguities involved in different digital modulation schemes.

TABLE 1

Properties of selected digital modulation methods

| Modulation Scheme | Bits per Symbol | Amplitude Ambiguity | Phase Ambiguity |
|---|---|---|---|
| BPSK | 1 | None/1 Level | 2 Levels |
| QPSK | 2 | None/1 Level | 4 Levels |
| 8-PSK | 3 | None/1 Level | 8 Levels |
| 2-ASK/4-PSK | 3 | 2 Levels | 4 Levels |
| 4-ASK/2-PSK | 3 | 4 Levels | 2 Levels |
| 8-ASK | 3 | 8 Levels | None/1 Level |
| 16-PSK | 4 | None/1 Level | 16 Levels |
| 16-QAM | 4 | 3 Levels | 12 Levels |
| 4-ASK/4-PSK | 4 | 4 Levels | 4 Levels |
| 64-QAM | 6 | 9 Levels | 52 Levels |

From Table 1 it follows also easily that the performance of an iterative decision-feedback demodulation scheme will further depend greatly on the number of ambiguities involved in the modulation scheme. A wrong assumption about the sent symbol leads to a wrong result of the channel estimation. Especially in modulation schemes with a high number of modulation states there is a high probability of erroneous symbols due to inevitable noise. A wrong channel estimation, in turn, leads to wrong correction and consequently more errors in received symbols. Therefore there is a need in the related art for improved reliability of the channel estimation.

The above-mentioned prior art addresses only the aspect of averaging the mean bit reliabilities of bits that are mapped onto one digital symbol by rearranging the mappings or by bit operations prior to mapping. While this has a good effect if the time-/frequency-variant channel is known very accurately, it does not provide means to improve the knowledge of the time-/frequency-variant channel at the receiver if the coherence time/frequency is relatively small compared to a data packet.

SUMMARY OF THE INVENTION

It is therefore the object of the present invention to provide a method which improves the reliability of the channel estimation in a digital transmission system.

It is a further object of the present invention to provide a transmitter for a digital communication system which enables improved reliability of the channel estimation.

This object is achieved by defining a special way of mapping repeated data words onto signal constellation points. A rearranged constellation pattern is selected that reduces the number of ambiguities when the original and the repeated data symbols are combined. That is, the number of different results that can be obtained by adding the complex values or vectors in the complex number plane representing the constellation points of a first transmission and of a re-transmission of the same data word is lower than the number of original constellation points or modulation states. This reduced number of ambiguities facilitates a better channel estimation, less dependent on or independent of the actual data symbol transmitted.

To achieve a reduced number of amplitude ambiguities:
1. Determine the amplitude and phase values for each constellation point of the original constellation. This may be represented by a complex value.
2. For each constellation point of the original constellation, determine one or more complex counterpart(s) such that
   a. The coherent combination of original complex value and counterpart complex value(s) for all data words results in a reduced number of amplitude levels compared to the original constellations
   b. The average transmit power of the counterpart constellation(s) is identical to the average transmit power of the original constellation (optional).

To achieve a reduced number of phase ambiguities proceed as follows:
1. Determine the amplitude and phase values for each constellation point of the original constellation. This can be represented by a complex value.
2. For each constellation point of the original constellation, determine one or more complex counterpart(s) such that
   a. the coherent combination of original complex value and counterpart complex value(s) for each one or at least a part of all data words results in a reduced number of phase levels compared to the original constellations;
   b. the average transmit power of the counterpart constellation(s) is identical to the average transmit power of the original constellation (optional).

Step b is optional in both cases, as it is not required for the reduction of ambiguity. However it provides the advantage of uniform transmission power on the channel over transmitted and retransmitted signals.

It should be noted that of course there is a one-to-one correspondence for each data word between the original constellation and a counterpart constellation. Therefore the relation between constellation points in the original constellation and each counterpart constellation is unambiguous, but may be arbitrary. Furthermore, all counterpart constellations have the same number of constellation points (distinct modulation states, different assigned complex values) as the original constellation.

The counterpart constellation(s) can be generated by the following method:
1. Divide the complex plane into two sub-planes that each contain half of the constellation points.
2. For each sub-plane, obtain an average complex value point of all constellation points in that sub-plane.
3. For each sub-plane, obtain a counterpart constellation by approximately mirroring the constellation points of each sub-plane on the average complex value point.

As each system adds noise and distortion to transmitted signals anyway, it is preferable, but not required, that the mentioned mirroring is mathematically exact. An approximate mirroring would be sufficient in a real system. Approximate means that the distance between the actual constellation point and the ideal mirrored position is less than half the distance to the closest constellation point representing a different value of the data word. Such approximate mirroring may be beneficially employed in a fixed-point representation of the complex values, where the mathematically exact solution cannot be represented due the reduced accuracy of fixed-point numbers.

If the condition of constant average transmit power is not required, the following, more general method may be applied:
1. Divide the complex plane into two sub-planes that each contain half of the constellation points.
2. For each sub-plane, obtain a symmetry axis with respect to at least some of the constellation points in that sub-plane.
3. For each sub-plane, obtain a counterpart constellation by approximately mirroring the constellation points of each sub-plane on one pre-defined point on the symmetry axis in that sub-plane.

It will be appreciated by those skilled in the art that these steps require very simple geometrical or calculus skills.

It should be noted that for constellations that are symmetrical to at least one arbitrary axis in the complex plane, preferably a division into two half-planes is done with respect to such a symmetry axis that does not include any signal point. For constellations that are symmetrical to the real or imaginary axis, that respective axis is used; otherwise the symmetry axis will be tilted.

It should be apparent that this method may result in counterpart constellations that are different in shape than the original constellation if the constellation is not point-symmetric to the mirroring point within each sub-plane. This is particularly true if the original constellation represents a PSK or any mixed ASK/PSK modulation apart from QAM.

Keeping the shape of the original constellation may have advantages in the implementation of the demodulator (LLR calculator) of the receiver, which will not be discussed in further detail herein.

To keep the same shape for the counterpart constellations as for the original constellation, step 1 to step 3 of the counterpart constellation generation should then be altered as follows:
1. Divide the complex plane into two sub-planes that each contain half of the constellation points.
2. Create counterpart constellations such that the number of counterpart constellations is one less than the number of constellation points in a sub-plane.
3. For each sub-plane in each counterpart constellation, permute the mapping of data words onto constellation points such that in original and counterpart constellations, each data word is mapped only and exactly once on each of the constellation points.

For certain modulation schemes, a reduction of both amplitude and phase ambiguities at the same time is not necessarily required for demodulation. For example in PSK schemes all data information is contained in the phase angle of the modulation symbol, the amplitude is quite irrelevant. For PSK the following procedure may be applied to obtain a counterpart constellation which reduces phase ambiguities:

1. Divide the complex plane into a number of sub-planes that each contain the same number of constellation points. This step is optional and may be omitted. In this case the whole complex plane is regarded as one "sub"-plane.
2. For each sub-plane, determine a symmetry axis with respect to the position of at least a part of the constellation points within this sub-plane.
3. Obtain a counterpart constellation by mirroring the constellation points of each sub-plane on the symmetry axis of this sub-plane.

The mapping of a word using the original constellation, i.e. the mapping of a data word onto a complex value according to the original constellation, results in the original constellation symbol or simply original symbol. Similarly the mapping of a data word using a counterpart constellation, i.e. the mapping of a data word onto a complex value according to a counterpart constellation, results in the counterpart constellation symbol or simply counterpart symbol.

According to one aspect of the invention, a method for transmitting data in a digital communication system comprises a first transmission step (1205) transmitting a data word modulated on a carrier according to a first mapping (401) of data word values to modulation states; and at least one further transmission step (1206) transmitting the same data word modulated on a carrier according to at least one further mapping (402) of data word values to modulation states, wherein a number of different combined values obtainable (410, 411), (712, 713), (811-814) for all data word values, by adding for each data word value complex values associated with said data word value according to said first and at least one of said further mappings, is lower than the number of different data word values within said first mapping (401, 701, 801).

According to another aspect of the present invention, a method for transmitting data in a digital communication system comprises the steps of transmitting a data word modulated on a carrier according to a first mapping of data word values to modulation states; and transmitting the data word modulated on a carrier according to a second mapping of data word values to modulation states, wherein the second mapping of data word values to modulation states is obtained from the first mapping of data word values to modulation states by: i. dividing a complex plane representing the first mapping of data word values to modulation states into at least two sub-planes (404, 405); ii. determining symmetry axes (412) for at least a part of the sub-planes with respect to modulation states comprised within each of the part of the sub-planes; and iii. assigning to at least a part of the data word values a complex value (409) in said second mapping (402), having a position in the complex plane which is approximately mirrored from a position (408) of a complex value assigned to said data word according to said first mapping (401), with respect to a point (407) on the symmetry axis of a sub-plane (405) in which the complex value (408) according to said first mapping (401) is located.

According to a further aspect of the present invention, a method for transmitting data in a digital communication system comprises m transmission steps of transmitting a data word modulated on a carrier according to the first mapping of data word values to modulation states; and transmitting the data word m−1 times, modulated on a carrier according to m−1 further mappings of data word values to modulation states, wherein the m−1 further mappings of data word values to modulation states are obtained from the first mapping by i. dividing a complex plane representing the first mapping of data word values to modulation states into sub-planes (706, 707), the number of modulation states within at least a part of the sub-planes being m; and ii. assigning to at least a part of the data word values different modulation states within the same sub-plane, one for each mapping.

According to still a further aspect of the present invention, a method for transmitting data in a digital communication system employing phase-shift key modulation comprises the steps of transmitting a data word modulated on a carrier according to a first mapping of data word values to modulation states; and transmitting the data word modulated on a carrier according to a second mapping of data word values to modulation states, wherein the second mapping of data word values to modulation states is obtained from the first mapping of data word values to modulation states by i. dividing a complex plane representing the first mapping of data word values to modulation states, into sub-planes (804, 805), at least a part of the sub-planes having a symmetry axis (806) with respect to positions of all modulation states comprised in the sub-plane; ii. determining symmetry axes (806) for at least a part of the sub-planes with respect to modulation states comprised within each of the part of the sub-planes; and iii. assigning to each of at least a part of the data word values a complex value in said second mapping (802), having a position (808) in the complex plane which is approximately mirrored from a position (807) of a modulation state assigned to said data word according to said first mapping (801), with respect to the symmetry axis (806) of a sub-plane in which the modulation state (807) according to said first mapping (801) is located.

According to still another aspect of the present invention, A computer-readable storage medium has stored thereon program instructions that, when executed in a processor of a transmitter of a digital communication system, cause the transmitter to perform a method according to one of the aspects described above.

According to still a further aspect of the invention, a transmitter (1300) for a digital communication system comprises a repeater (1304) for receiving data words and for repeating the received data words at least once; and a mapper (1310) for mapping the data words and their repetitions to modulation states according to their values. The mapper is configured for a) mapping a data word to a modulation state according to a first mapping of data word values to modulation states; and b) mapping the at least one repetition of the data word to a modulation state according to at least one further mapping of data word values to modulation states. The transmitter further comprises a mapping control unit (1306) configured for providing to said mapper said first and said at least one further mapping, wherein a number of different combined states obtainable, for all data word values, by adding for each data word value complex values of modulation states associated with said data word value according to said first and at least one of said further mappings, is lower than a number of different data word values within said first mapping of data word values to modulation states. The transmitter further comprises a modulator (1311) for modulating a carrier according to the modulation states.

According to still another aspect of the present invention, a transmitter (1300) for a digital communication system comprises a repeater (1304) for receiving data words and for repeating the received data words once; and a mapper (1305) for mapping the data words and their repetitions to modulation states according to their values. The mapper is configured for a) mapping a data word to a modulation state according to a first mapping of data word values to modulation states; and b) mapping the repetition of the data word to a modulation state according to a second mapping of data word values to modulation states. The transmitter further comprises a mapping control unit (1306) configured for providing to said mapper said first and said second mapping, wherein the second mapping of data word values to modulation states is obtained from said first mapping of data word values to modulation states by i. dividing a complex plane representing the first mapping of data word values to modulation states into sub-planes; ii. calculating an average value of complex values of all modulation-states contained in each of at least a part of the sub-planes; and iii. assigning to each of at least a part of the data word values a complex value in said second mapping, having a position in the complex plane which is approximately mirrored from a position of a complex value assigned to said data word value according to said first mapping, with respect to a position of the average value of all modulation states in a sub-plane in which the complex value according to said first mapping is located. The transmitter further comprises a modulator (1311) for modulating a carrier according to the modulation states.

According to still a further aspect of the invention, a transmitter (1300) for a digital communication system comprises a repeater (1304) for receiving data words and for repeating the received data words m−1 times; a mapper (1305) for mapping the data words and their repetitions to modulation states according to their values and according to m different mappings of data word values to modulation states; and a mapping control unit (1306) configured for providing to said mapper said m mappings, wherein m−1 further mappings of data word values to modulation states are obtained from a first mapping of data word values to modulation states by i. dividing a complex plane representing the first mapping of data word values to modulation states into sub-planes, the number of modulation states within at least a part of the sub-planes being equal to the number of transmitting steps; and ii. assigning to at least a part of the data word values different modulation states within the same sub-plane, one for each mapping. The transmitter further comprises a modulator (1311) for modulating a carrier according to said modulation states.

According to still another aspect of the present invention, a transmitter (1300) for a digital communication system employing phase-shift key modulation comprises a repeater (1304) for receiving data words and for repeating the received data words once; and a mapper (1305) for mapping the data words and their repetitions to modulation states according to their values. The mapper is configured for a) mapping a data word to a modulation state according to a first mapping of data word values to modulation states; and b) mapping the repetition of the data word to a modulation state according to a second mapping of data word values to modulation states. The transmitter further comprises a mapping control unit (1306) configured for providing to said mapper said first and said second mapping, wherein the second mapping of data word values to modulation states is obtained from said first mapping of data word values to modulation states by i. dividing a complex plane representing the first mapping of data word values to modulation states into sub-planes, at least a part of the sub-planes having a symmetry axis with respect to positions of all complex values of modulation states comprised in the sub-plane; and ii. assigning to each of at least a part of the data word values a complex value in said second mapping, having a position in the complex plane which is approximately mirrored from a position of a complex value assigned to said data word value according to said first mapping, with respect to the symmetry axis of a sub-plane in which the complex value according to said first mapping is located. The transmitter further comprises a modulator (1311) for modulating a carrier according to the modulation states.

According to still a further aspect of the present invention, a base station (1400) of a digital wireless communication system comprises the transmitter (1300) according to one of the aspects described above.

According to still another aspect of the present invention, a mobile station (1500) of a digital wireless communication system comprises the transmitter (1300) according to one of the aspects described above.

BRIEF DESCRIPTION OF THE DRAWINGS

The accompanying drawings are incorporated into and form a part of the specification for the purpose of explaining the principles of the invention. The drawings are not to be understood as limiting the invention to only the illustrated and described examples of how the invention can be made and used. Further features and advantages will become apparent from the following and more particular description of the invention, as illustrated in the accompanying drawings, wherein FIG. 1 gives an overview over various digital modulation mapping constellations;

FIG. 4 depicts the effect of the described method when applied to QPSK modulation;

FIG. 9 shows an example of eight mappings for 16-PSK modulation;

FIG. 18 shows an example for an original mapping and a counterpart mapping in 16-QAM yielding four different combination result values similar to QPSK modulation states.

In all figures that show mappings or constellations, a point is identified by a numeric label. It should be apparent to those skilled in the art that this labelling is meant to represent a given data word or bit sequence in the context of communication; the labels themselves are solely used to represent a fixed but arbitrary data word; sequential labels therefore do not have to represent sequential bit sequences in terms of their binary, octal, decimal, hexadecimal, or other numeric representation.

DETAILED DESCRIPTION OF THE INVENTION

Figure 2:
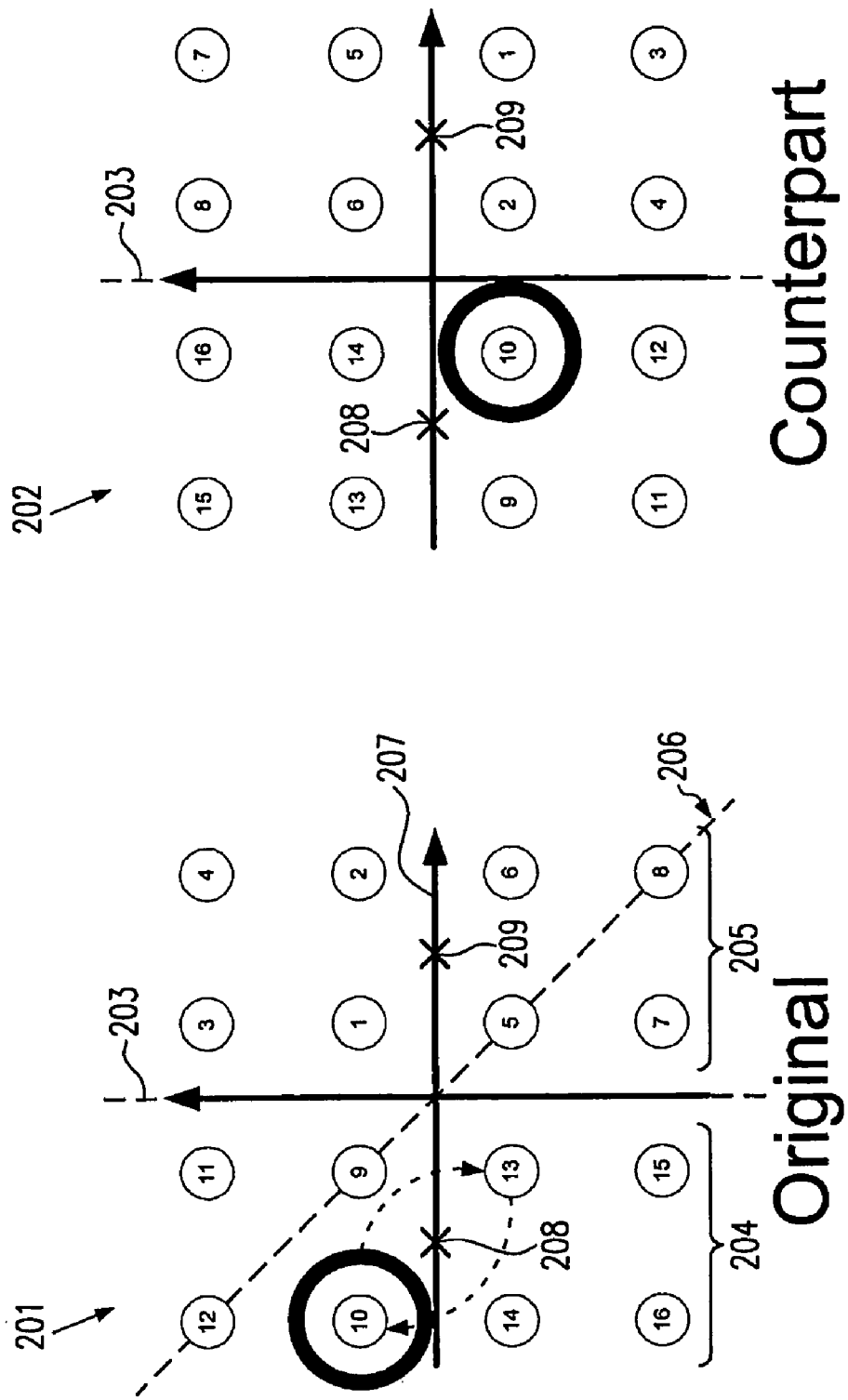
FIG. 2 illustrates an example of original and repeated data word location for data word no. 10 in 16-QAM.

FIG. 2 shows an example of a transmission using the 16-QAM modulation scheme. According to Table 1, such a data modulation symbol carries four bits. In the method described herein, these four bits are transmitted twice:
1. Using a first constellation mapping 201 for the original data word of four bits;
2. Using a second, different, constellation 202 for the repeated data word of four bits.

Without loss of generality we assume in the following that the average transmit power of a constellation is equal to 1. The values given in the figures refer to this situation. It should be apparent to those skilled in the art how to adjust the values properly if the average transmit power is different from 1. It is also obvious how to obtain transmit power values of digital modulation symbols such that the average transmit power of all digital modulation symbols is 1, or any other arbitrary value.

To obtain counterpart constellation 202 from original constellation 201, the complex plane is divided along imaginary axis 203 into two sub-planes 204 and 205. For the constellation in FIG. 2, the imaginary axis is a symmetry axis. Diagonal line 206 might also be used, but it is advantageous to select a parting line for both sub-planes, on which no constellation points are located. Next, symmetry axes for both sub-planes are determined. In the case of FIG. 2, the real axis 207 is a symmetry axis for both sub-planes. To obtain a reduced ambiguity after combining an original transmitted data word with its repeated version, the position of a constellation point in the counterpart constellation has to be mirrored with respect to a point 208, 209 on the symmetry axis, that is the real axis 207, from the original constellation point. According to the division into sub-planes 204 and 205, all constellation points belonging to sub-plane 204 have to be mirrored with respect to point 208, while all constellation points belonging to sub-plane 205 have to be mirrored with respect to point 209. In order to achieve identical average transmission power of transmission and retransmission, this mirroring point 208, 209 should be equal to the average of all complex values in this sub-plane.

In FIG. 2, for word number 10 the modulation states or constellation points of the original mapping and the counterpart constellation are highlighted.

Figure 3:
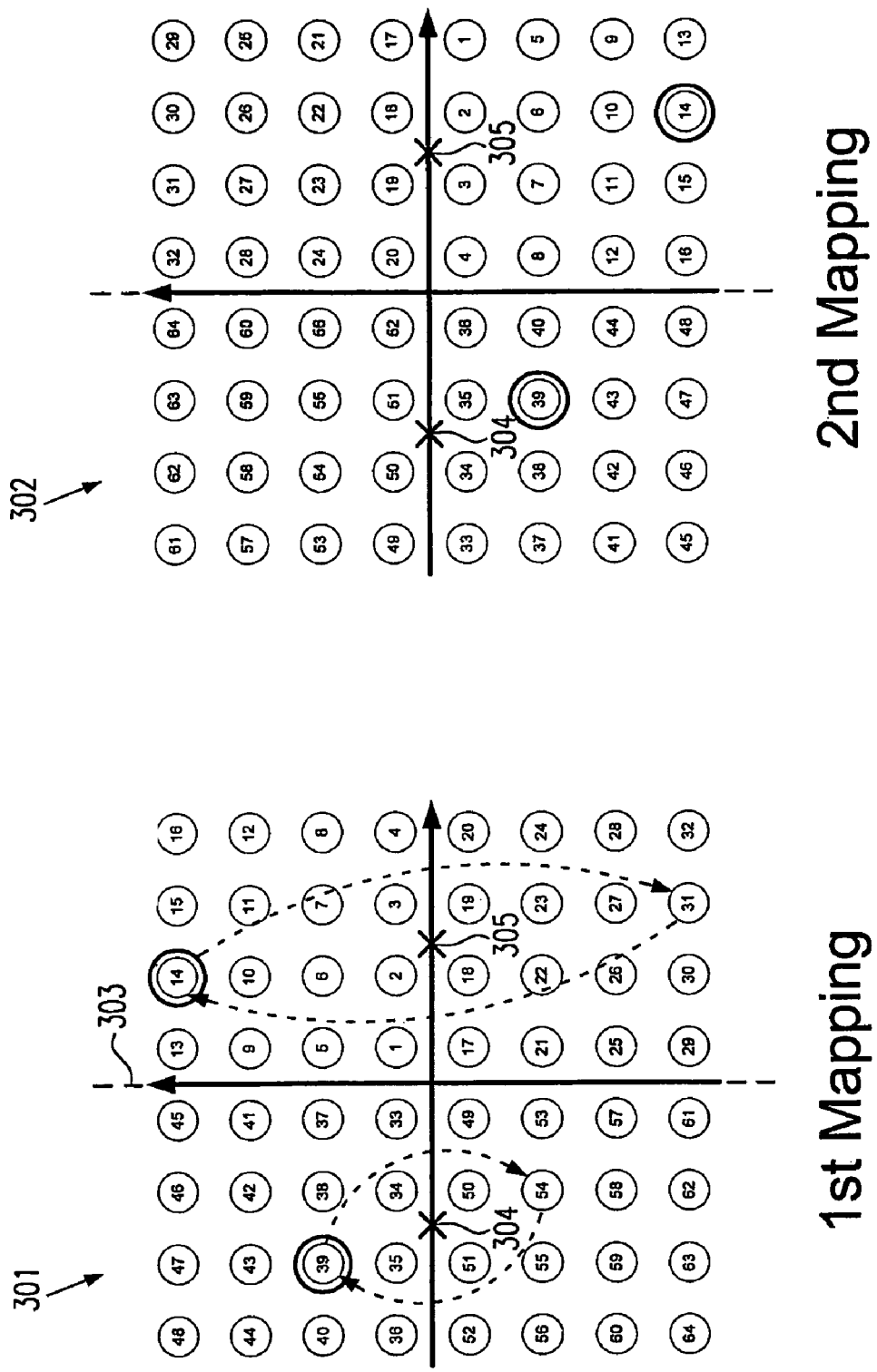
FIG. 3 illustrates an example of original and repeated data word location for data word no. 14 and 39 in 64-QAM.

FIG. 3 shows a first 301 and a further mapping 302 for 64-QAM. Here, again, the complex plane is divided into two sub-planes along the imaginary axis 303. Then for the second mapping, each constellation point is mirrored from its original position in the first constellation with regard to the average complex value 304, 305 in the same sub-plane, respectively according to the sub-plane to that a constellation point belongs.

The result of combining original transmission and repeated transmission of the same arbitrary word is demonstrated in FIG. 4 for the example of QPSK. To obtain the second or further or counterpart mapping 402 from the first or original mapping 401, the complex plane is divided along imaginary axis 403 into two sub-planes 404 and 405. In each sub-plane, the constellation points are mirrored with regard to average values 406 and 407, respectively. The word number "1" is represented in the first mapping by vector 408 and in the second mapping by vector 409. As average carrier amplitude is defined to be 1, each vector has a length of 1. Coherent combining of the symbols is equivalent to the addition of both vectors which yields a real number 410 of √2. FIG. 4 b-d show the coherent combining for word numbers "2", "3" and "4" respectively. It appears that the number of ambiguities is reduced to one amplitude level and two phase levels 410 and 411, similar to a BPSK modulation. This allows to easily and unambiguously determine the attenuation of a transmission channel, and its phase shift between −π and +π.

The principle explained in conjunction with FIG. 4 for the example of QPSK can be applied in a similar way to all QAM constellations, whereby the coherent combining results in just two values, independent of the number of modulation states or constellation points.

Figure 5:
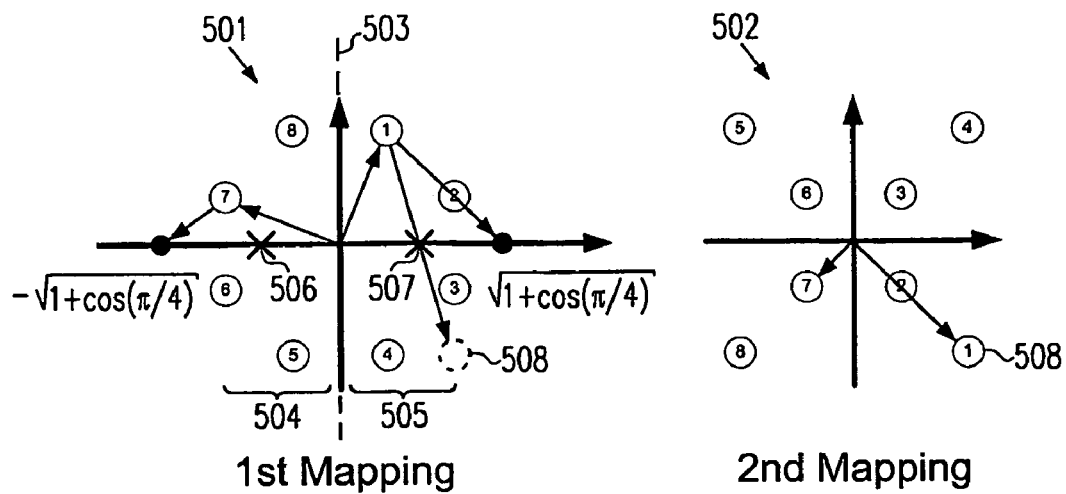
FIG. 5 illustrates an alternative example of two mappings for original 8-PSK modulation.
Figure 6:
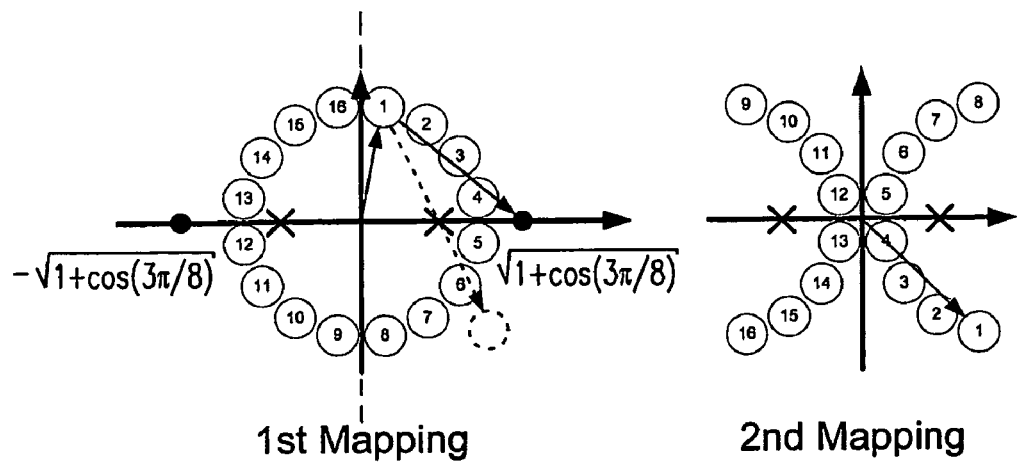
FIG. 6 shows an alternative example of two mappings for original 16-PSK modulation.

If it is not required to maintain the shape of the original constellation for the counterpart (or second or further) constellation, it is always possible to find a single counterpart constellation that fulfils the requirements of reducing the number of ambiguities at least to a BPSK equivalent. An example for this situation is shown in FIG. 5, where the original (first) mapping follows the 8-PSK scheme. To achieve the BPSK-equivalence after coherent combining of two mappings, the complex plane is divided along imaginary axis 503 into sub-planes 504 and 505. In each sub-plane each constellation point is mirrored with regard to average complex value 506 or 507, respectively. For example, the constellation point for the word number "1" is mirrored with respect to point 507 to position 508. The counterpart (second) mapping 502 results in a mixed ASK/PSK constellation. FIG. 6 shows a similar situation for the case that the original (first) mapping is a 16-PSK scheme. If the ambiguity is to be reduced to a BPSK equivalence, then the counterpart (second) mapping is quite irregular.

If the shape of the original constellation should be kept for the counterpart constellation(s), it may happen that more than one counterpart constellation is required to reduce the ambiguities to a BPSK-equivalent situation. This is particularly true for PSK modulations with more than four signal constellation points. Examples for such counterpart constellations and results from coherent combination of same are given in FIG. 7 for 8-PSK, and in FIG. 9 and FIG. 10 a-c for 16-PSK.

Figure 7:
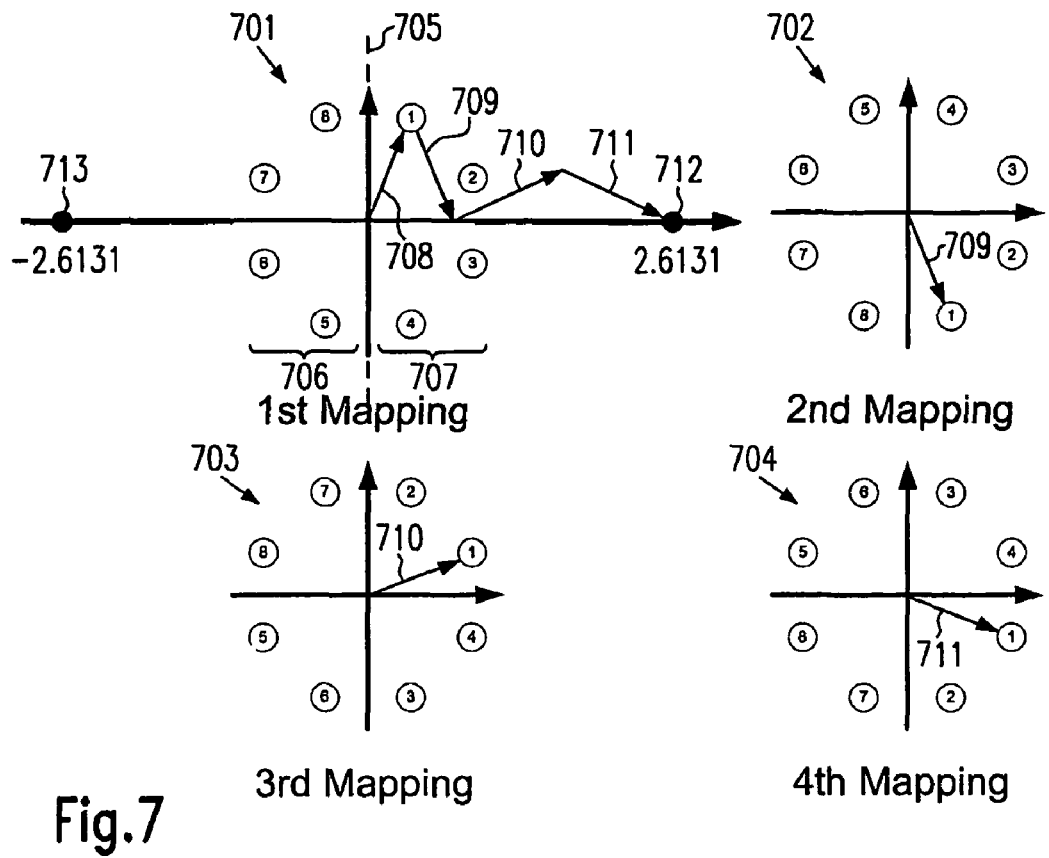
FIGS. 7 and 8 illustrate two alternatives for improving the reliability of the channel estimation in the case of 8-PSK modulation.

Turning to FIG. 7, the complex plane of original constellation (first mapping) 701 is divided into two sub-planes 706 and 707 by imaginary axis 705. Within each sub-plane the mappings of a given data word onto a constellation point are permuted such that the same word is assigned exactly once to each position (constellation point) in its sub-plane within all mappings 701-704. Consequently, coherent combining of all four transmissions of the same word results in the same value, independent of the word value. In FIG. 7, word number "1" is represented by vector 708 in the first mapping 701, by vector 709 in second mapping 702, by vector 710 in the third mapping 703 and by vector 711 in mapping 704. The result 712 is the real value of roughly 2.6131 for all word values assigned to the right half plane, as for all word values the same vectors are added, just in different order. Similarly the real value of roughly −2.6131 is the result 713 for all values assigned to the left half-plane. Consequently a BPSK-equivalent situation of one amplitude and two phase levels can be achieved by using four mappings of words onto constellation points.

Figure 8:
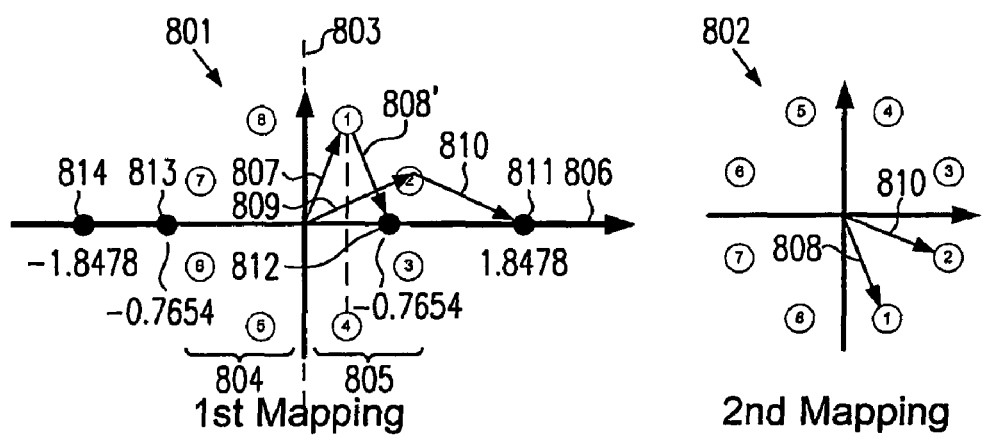
Figure 10A:
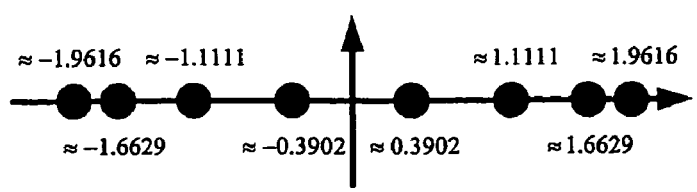
FIGS. 10 *a-c* depict examples of results from coherent combining of identical data word values using 2, 4 or 8 different mappings of FIG. 9, respectively.
Figure 10B:
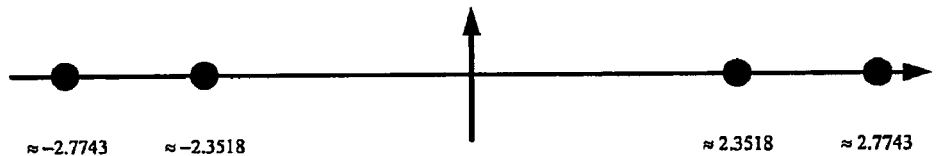
Figure 10C:

If only phase ambiguity should be removed for PSK schemes, it can be enough to use only one counterpart constellation which results in a combined result like in FIG. 8 or FIG. 10a or 10b, which already show only two phase levels (in this case 0 degree and 180 degree to the real axis).

In FIG. 8, the complex plane is divided along imaginary axis 803 into sub-planes 804 and 805. Instead of mirroring each constellation position from its position in first mapping 801 with regard to a point, to obtain the position within second mapping 802, the position is mirrored with regard to the real axis 806, which is a symmetry axis for both sub-planes. The combination of first (original) transmission and repeated transmission of word number "1" is the sum of vectors 807 and 808, which yields the real value of roughly 0.7654 at point 812. The same would hold true for word number "4". When combining vectors 809 and 810 for word numbers "2" or "3", the result is roughly 1.8478 at point 811.

Even though the ambiguity in amplitude is higher than 1, such a scenario will improve the channel estimation capabilities greatly, as the exact amplitude may not be required in the demodulation process of a PSK modulation scheme.

FIG. 9 shows 8 different mappings for 16-PSK. If only first and second mapping are combined, 8 results are possible as shown in FIG. 10a (four amplitude levels and two phase levels). When the first four mappings are combined, four results occur, as shown in FIG. 10b (two amplitude levels and two phase levels). Only when all 8 mappings are combined, ambiguity is reduced to 2 phase levels.

The procedure disclosed in this invention can be interpreted as a rearrangement of the word-to-constellation-point mapping rules between the original and the repeated version of the word. Therefore we refer to this method also as "Repetition Rearrangement", or "ReRe" for short in following sections.

Figure 11:
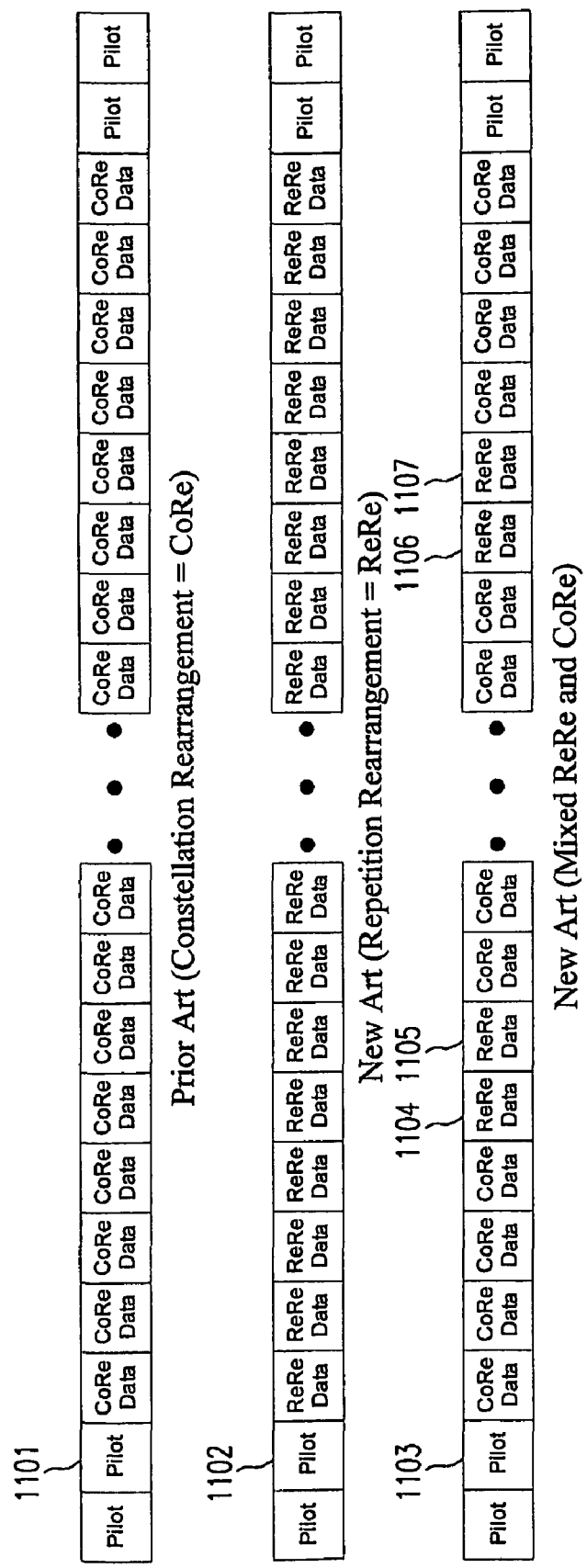
FIG. 11 depicts examples of a one-dimensional frame structure for Pilot and Data symbols.

Not all words in a frame have to be transmitted using the repetition rearrangement approach as disclosed in the present invention. If the channel is only slowly varying, a small number of ReRe words can be sufficient to facilitate good channel estimation conditions for a receiver. Consequently other data words can use other methods known from prior art, such as Simple Mapping repetition or Constellation Rearrangement (CoRe) repetition. The latter is the preferred solution as it usually provides smaller bit error rates at a receiver. Such alternatives are depicted in FIG. 11. Data frame 1101 contains data transmitted according to prior art, in this case with constellation rearrangement. In contrary, data frame 1102 contains only data transmitted according to the method presented herein. Data frame 1103 contains data transmitted according to both methods. Data word 1104, transmitted using a first (original) mapping, is repeated as data word 1105 according to a second mapping as described in detail above. The same applies to data word 1106, which is retransmitted as data word 1107.

The amount and position of ReRe data symbols may be additionally signalled in a Control Channel explicitly or by means of a predefined parameter from the transmitter to the receiver, to provide the receiver with knowledge which part of the data frame follows which repetition strategy.

For fast variant radio channels, it is advantageous that an original symbol and its counterpart symbol(s) are transmitted in adjacent places within a time frame, since the benefit of repetition rearrangement depends on channel conditions that are as equal as possible for original and counterpart symbols. Alternatively it would be possible to transmit original symbol and counterpart symbol at the same time in different frequency channels of a FDMA system, or in different code channels of a CDMA system. It should be obvious to those skilled in the art that these alternatives can be combined. For example in an OFDM system, the original and counterpart symbol can be transmitted on adjacent subcarriers, in adjacent time slots, or both. The latter possibility is particularly applicable when there are several counterpart symbols to be transmitted with the same original symbol, for example three counterpart symbols for 8-PSK. Then the first counterpart symbol can be transmitted in an adjacent time slot in the same subcarrier as the original symbol; the second counterpart symbol can be transmitted in the same time slot in an adjacent subcarrier to the original symbol; the third counterpart symbol can be transmitted in an adjacent subcarrier in an adjacent time slot to the original symbol.

The examples shown in the figures show mapping constellations that result in combined signal points that come to lie on the right axis in the graphs, usually representing the real part axis in the complex signal plane. It should be apparent to those skilled in the art that other mappings can be defined that reach a reduced number of ambiguities without resulting in combined signal points on the real axis. For example, it is very easy to define QAM mappings that result in signal points on the imaginary axis. Likewise it is easily possible to define mappings for PSK that result in points on a straight line inclined at a certain angle to the real axis. Which of such mappings is chosen can be an implementational choice of the system designer, and has no direct influence on the technical concept as far as this invention is concerned.

Figure 1:
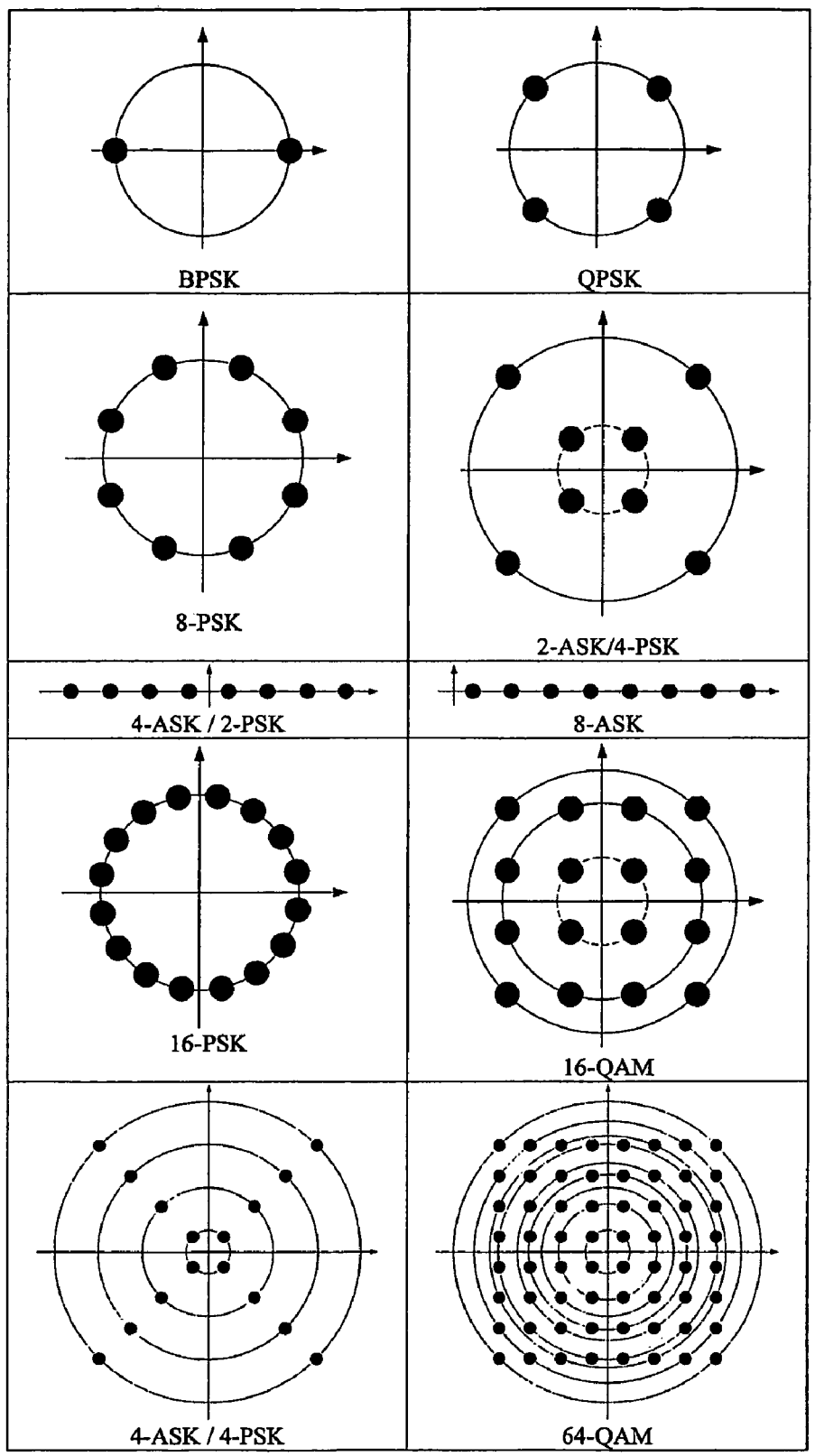

A similar situation occurs if the original constellation is not as shown in these figures, but shifted by a certain angle or lateral value. It should be apparent from FIG. 1 that the 4-ASK/2-PSK may be interpreted as a shifted version of 8-ASK. Therefore it should be obvious to those skilled in the art to derive proper mappings for such scenarios.

This description has focussed on modulation constellations that require coherent demodulation. Consequently the algorithm described is formulated such that original and rearranged constellation points are combined coherently as well. However it should be apparent that the design algorithm as well as the combining method can be easily modified to be suitable for a non-coherent approach. For example, for ASK a simple non-coherent detection of the carrier amplitude would be possible, and the scalar values could be added for combination.

In the detailed description above, always two sub-planes have been used. As an alternative example for multiple divisions into sub-planes, the division could be done into 4 quarter-planes, each quarter-plane resembling a quadrant of the complex plane. A counterpart constellation to the 1st Mapping in FIG. 9 could then be the 3rd mapping in the same figure; the resultant combination would then be equivalent to a QPSK modulation from an ambiguity point of view.

An original and counterpart mapping for 16-QAM which results in a QPSK-equivalent combination is shown in FIG. 18 a-b respectively. Even though there is a higher number of ambiguity levels involved in such an alternative, it may be advantageously employed in a communication system; on one hand the number of ambiguity levels is increased which makes the channel estimation less accurate, but on the other hand the power of the transmitted and re-transmitted data words is better equalised which can improve the LLR statistics after demodulation, which in turn can improve the performance of a subsequent decoding stage in a receiver. Consequently the target of the present invention could be a resultant combination equivalent to a QPSK, an 8-PSK, a 8-ASK. Those skilled in the art will appreciate that an improvement will be achieved as soon as the number of ambiguity levels in the resultant combination is reduced compared the original constellation.

A further side criterion when choosing counterpart mappings is that under no circumstances the coherent combination should result in the origin of the complex plane. This is simply due to the reason that a receiver could not extract any information on the channel state from a combined signal point of complex value 0.

In another alternative, only a sub-set of all possible modulation states or a sub-set of all existing data word values may be subject to the described method. Even this way ambiguity in the determination of transmission channel properties may be reduced.

This description has assumed that the original and repeated data word consist each of the same b-bit bit sequence. For simplicity of the description, a mapping was assumed that maps b bits onto one complex value. Therefore an original constellation consists of $2^b$ distinct complex values, and a counterpart constellation consists of $2^b$ complex values. Those skilled in the art will notice that an original constellation and one or more counterpart constellations can be summarised into a "super-constellation". This super-constellation may then represent a "super-mapping" that summarises the original mapping and one or more counterpart mappings. In such a case the control information that signifies the original or counterpart mapping has to be included into the super-mapping or super-constellation.

A control word is pre-pended to each data word. The control word assumes a specific value for each transmission, e.g. "1" for the first transmission of a data word, "2" for the second transmission of the same data word, and so on. The super-mapping maps the different values of concatenated control word and data word to modulation states or super-constellation points. Thus, different mappings from data word values to modulation states are obtained for different values of the control word. If the super-mapping is arranged in an appropriate way, the different mappings from data word values to modulation states may exhibit the properties described above.

Figure 16A:
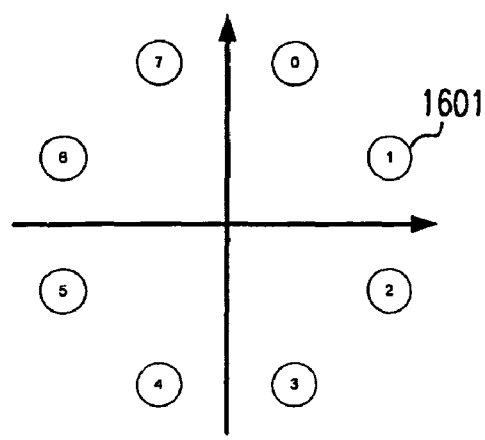
FIGS. 16 *a-c* show an example of combining original and counterpart mapping into a super-mapping for an original 8-PSK modulation.
Figure 16B:
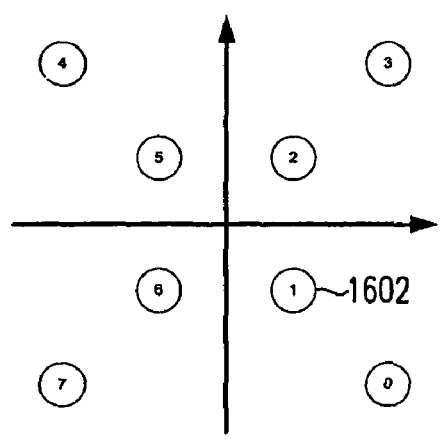

FIG. 16a shows an original constellation for the example 8-PSK, and FIG. 16b shows the related counterpart constellation. For example, constellation point 1601 represents symbol "1" in a first transmission and constellation point 1602 represent the same symbol in a second transmission or re-transmission.

Figure 16C:
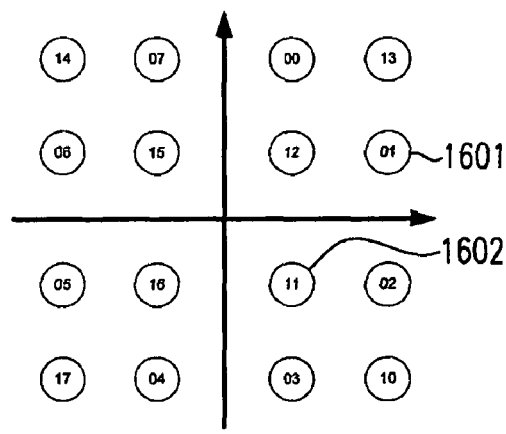

It may be noted that the difference to the constellations shown in FIG. 6 is limited to different labels of the constellation points. This difference is only a matter of convenience; those skilled in the art will realise that it is a matter of convention whether symbols are numbered from 1 to 8 or from 0 to 7. From the constellations in FIGS. 16a and 16b the super-constellation in FIG. 16c is obtained by including the constellation points from both constellations, prepending a leading "0" or "1" to the label to signify whether this constellation point was generated using the original or the counterpart mapping respectively. Consequently in FIG. 16c all points bearing a label that begins with "0" are equivalent to the original constellation points and the respective mapping, and all points bearing a label that begins with "1" are equivalent to the counterpart constellation and the respective mapping.

Figure 17A:
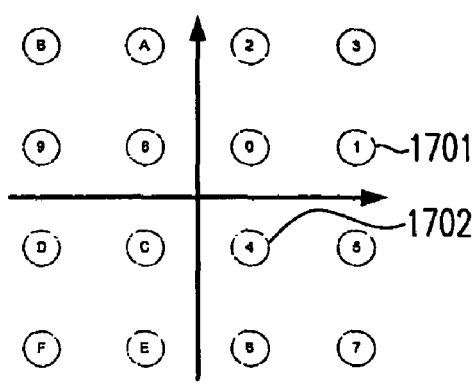
FIGS. 17 *a-c* show an example of combining original and counterpart mapping into a super-mapping for an original 16-QAM modulation.
Figure 17B:
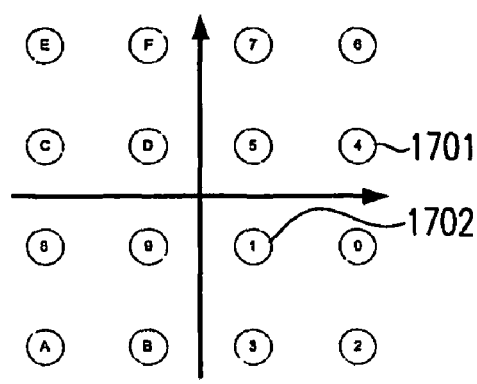
Figure 17C:
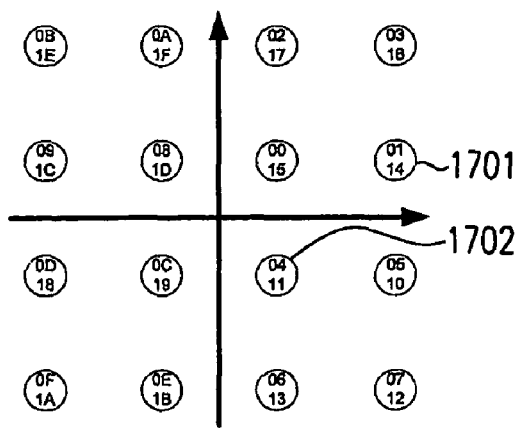

FIG. 17a shows an original constellation for the example 16-QAM, and FIG. 17b shows the related counterpart constellation. It may be noted that the difference to the constellations shown in FIG. 2 is limited to different labels of the constellation points, following the same reason as described above for FIGS. 16a-c. From the constellations in FIGS. 17a and 17b the super-constellation in FIG. 17c is obtained by including the constellation points from both constellations, prepending a leading "0" or "1" to the label to signify whether this constellation point was generated using the original or the counterpart mapping respectively. Since the positions of constellation points are identical, and the original and counterpart constellations vary only in the labelling, in FIG. 16c each constellation point has to represent two labels. For example, constellation point 1701 represents value "1" in a first transmission and value "4" in a second transmission or re-transmission. Consequently, it represents the values "01" and "14" in the super-constellation. Similarly, point 1702 represents "4" in the first transmission and "1" in the second transmission. In the super constellation of FIG. 17c it represents the values "04" and "11".

All labels that begin with "0" are equivalent to the original constellation points and the respective mapping and label, and all labels that begin with "1" are equivalent to the counterpart constellation and the respective mapping and labels.

Figure 12:
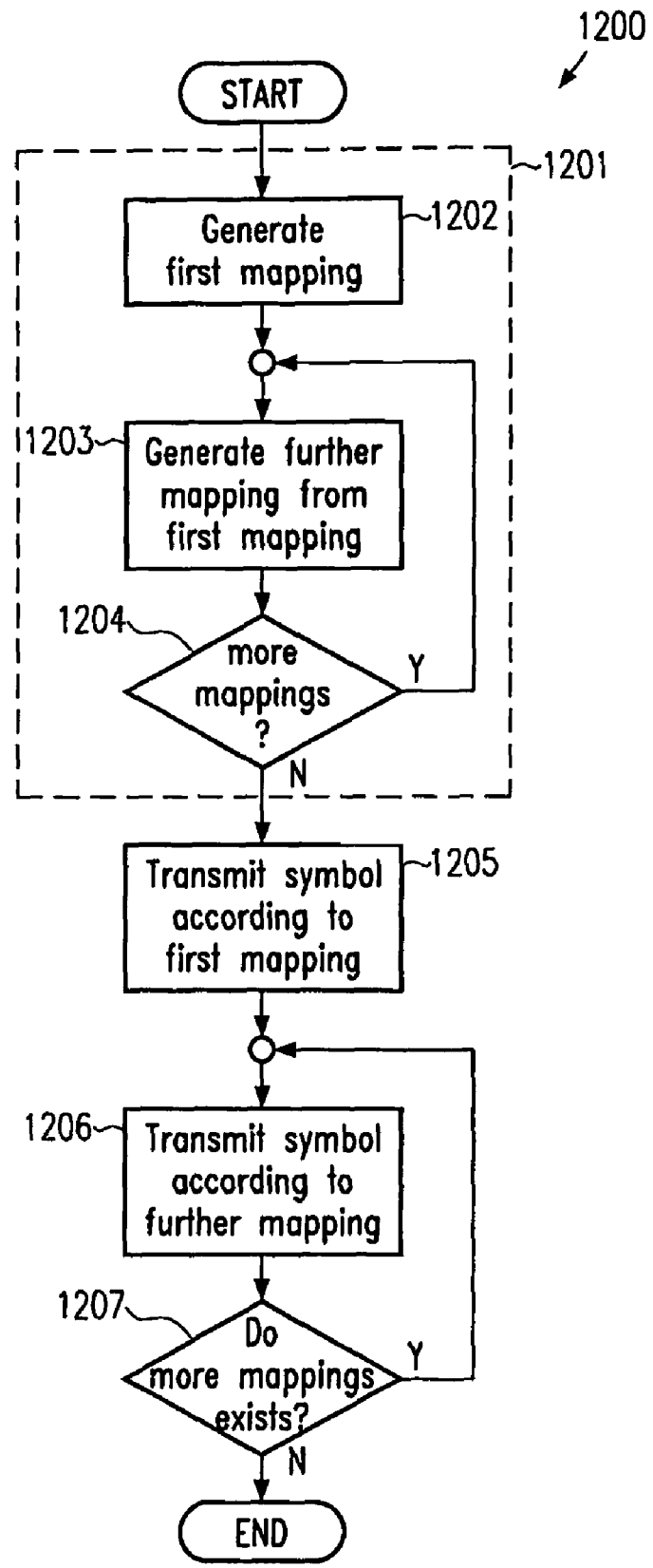
FIG. 12 illustrates steps of a method for data transmission in a digital communication system.

It may be noted that such super-mappings and super-constellations are similar in nature to the so-called "set partitioning" approach that is known to those skilled in the art of Trellis-Coded Modulation. Example literature for this can be found in G. Ungerboeck, "Trellis-coded modulation with redundant signal sets Part I: Introduction" and "Trellis-coded modulation with redundant signal sets Part II: State of the art", both in IEEE Communications Magazine, Volume: 25, Issue: 2, February 1987, Pages: 5-11 and 12-21. FIG. 12 shows a flow chart for a method which may be used to reduce the ambiguities in data symbols in a digital communication system. The method consists of a mapping generation step 1201, a transmission step 1205 and one or more retransmission steps 1206.

To start with, a first mapping is generated in step 1202. This mapping may be generated at random, according to a specified algorithm or by simply reading it from a table stored in the transmitter employing this method. This table may further be received from another entity like a base station or a mobile station for which the transmission is designated. A further step 1203 then generates a second mapping according to one of the algorithms given above. Step 1204 queries whether more mappings should be generated. In this case the loop returns to step 1203. If not, the method proceeds with step 1205. The generated mappings may be stored in the table for later use. Therefore the generation step 1201 is not necessarily required for each transmission session or even for each transmitted data word. Furthermore, it is also possible to store all used mappings during production of the transmitter, for example with the firmware download, or to receive all mappings from another entity and to store them in the table in the memory.

In step 1205, a symbol is transmitted according to the first mapping representing a data word. The same data word is transmitted again as a re-transmit symbol in step 1206 according to a second mapping generated in step 1203. Step 1207 queries whether more mappings exist according to which the data word should be transmitted. If this is the case, the method goes back to repeat steps 1206 and 1207. If no further mapping exists, the method ends the transmission of this data word. Although all transmissions of the same data word should advantageously be sent in close temporal proximity, other data words might be transmitted in between.

Figure 13:
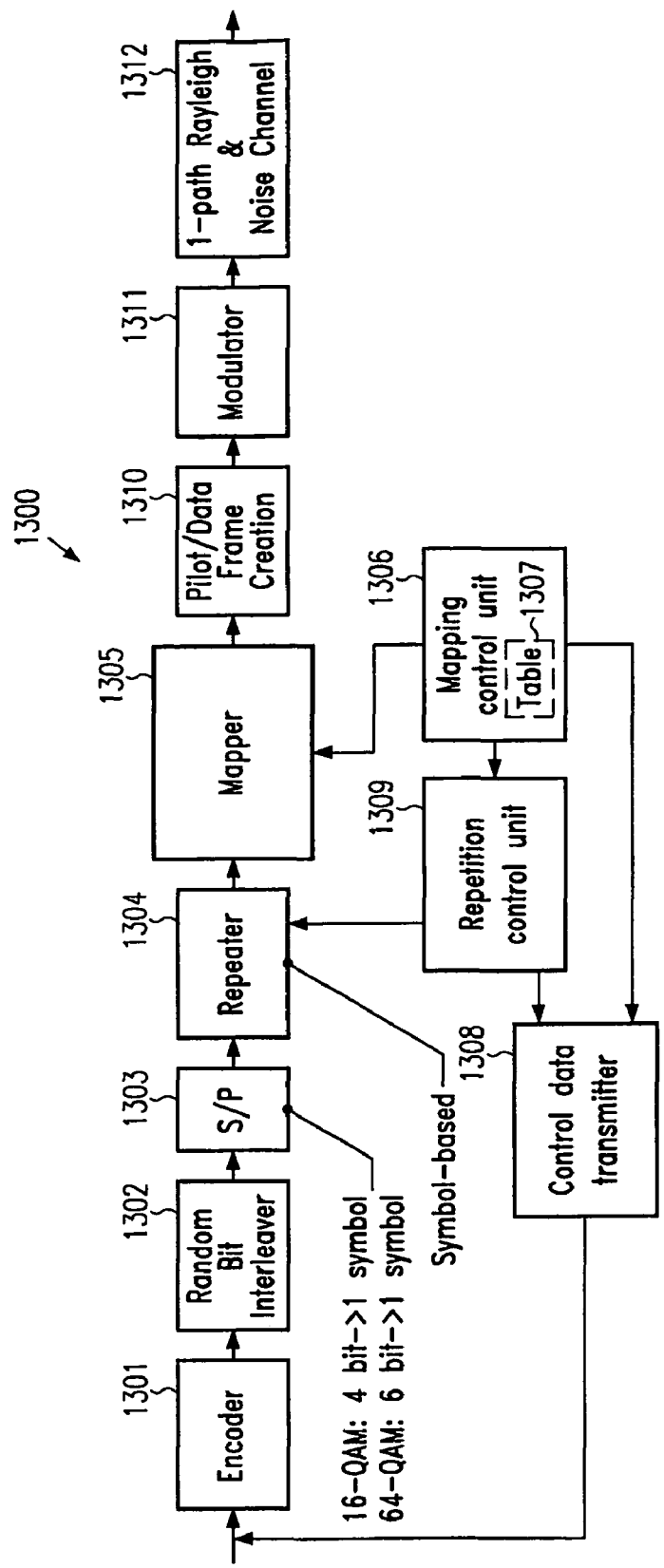
FIG. 13 shows an example of a transmitter chain.

In FIG. 13 a transmitter 1300 is illustrated which can be used to transmit data according to the method described above.

In the transmitter 1300, an information bit stream to be transmitted is encoded in encoder 1301. The encoded bit stream is interleaved in random bit interleaver 1302. In S/P unit 1303, groups of bits are combined to data words. The number of bits to be combined depends on the number of modulation states available. For example, for 16-QAM Id 16=4 bit are combined into one data word, for 64-QAM Id 64=6 bit are combined into one data word. In repeater 1304, data words are repeated for re-transmission. The repetition factor and the ratio of data words to be repeated is depending on the particular version of the method. The generated words are sent to mapper 1305. Mapper 1305 may work according to different modes. In a first mode equivalent to Simple Mapping, it maps un-repeated words or maps repeated words to complex symbols using only one word-to-constellation-point mapping. In a constellation rearrangement mode, mapper 1305 applies the constellation rearrangement described in the prior art section by applying different mappings to the words generated by repeater 1304. In a third mode, mapper 1305 applies the method described herein to the words generated by repeater 1304. Mapper 1305 is controlled by mapping control unit 1306 which selects the mapping mode to be applied to the words. If the third mode is selected, mapper 1305 receives mapping information from mapping control unit 1306 which may comprise a memory 1307 for storing a table containing mapping information. Mapping control unit 1306 is further configured to select in the third mapping mode the second and further mappings (i.e. counterpart mappings or counterpart constellations) for the re-transmissions derived from the first mapping used for the first transmission according to the rules defined above. The mappings may be calculated at run time according to the rules given above. Alternatively they may be read out from the table in memory 1307 where they have previously been stored according to a communication system design.

Various mapping modes as described above may be used alternatively, according to information provided by the network or by the receiving unit. Further they may be used alternately within a single frame according to a pre-defined pattern like with frame 1103 shown in FIG. 11. Information about such a pattern, as well as information about the mappings used may be sent to the receiving unit via control data transmitter 1308 and transmission channel 1312. Further, repetition control unit 1309 controls the repetition factor of repeater 1304 according to the requirements of mapping control unit 1306. For example, in the third mapping mode repetition control unit 1309 receives information from mapping control unit 1306 about the number of repetitions required for the selected mapping.

After the mapping, pilot data is added and frames are combined in Pilot/Data frame creation unit 1310 before the information is modulated onto a carrier in modulator 1311. The modulated signal is sent to a receiving entity via channel 1312.

Depending on the particular implementation, transmitter 1300 may comprise further units like IF stage, mixers, power amplifier or antenna. From a signal flow point of view, such units might also be seen comprised in channel 1312, as they all may add noise to the signal or exert phase shift or attenuation on the signal.

Units 1301 to 1311 may be implemented in dedicated hardware or in a digital signal processor. In this case the processor performs the method described herein by executing instructions read from a computer-readable storage medium like read-only memory, electrically erasable read-only memory or flash memory. These instructions may further be stored on other computer-readable media like magnetic disc, optical disc or magnetic tape to be downloaded into a device before it is brought to use. Also mixed hardware and software embodiments are possible.

Figure 14:
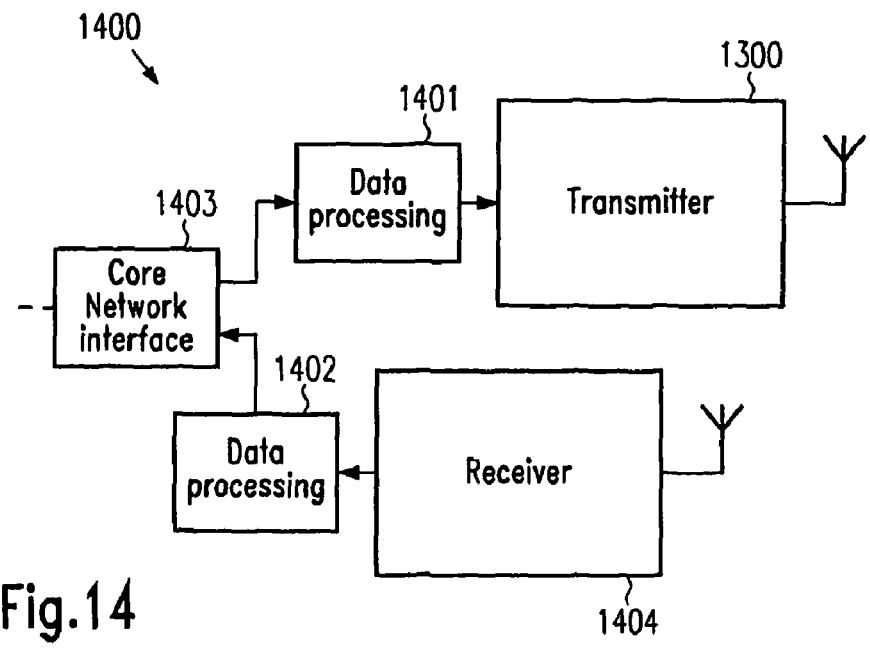
FIG. 14 illustrates an exemplary structure of a base station.

Transmitter 1300 may be part of a base station 1400 as shown in FIG. 14. Such a base station may further comprise a suitable receiver 1404, data processing units 1401 and 1402 and a core network interface 1403.

Figure 15:
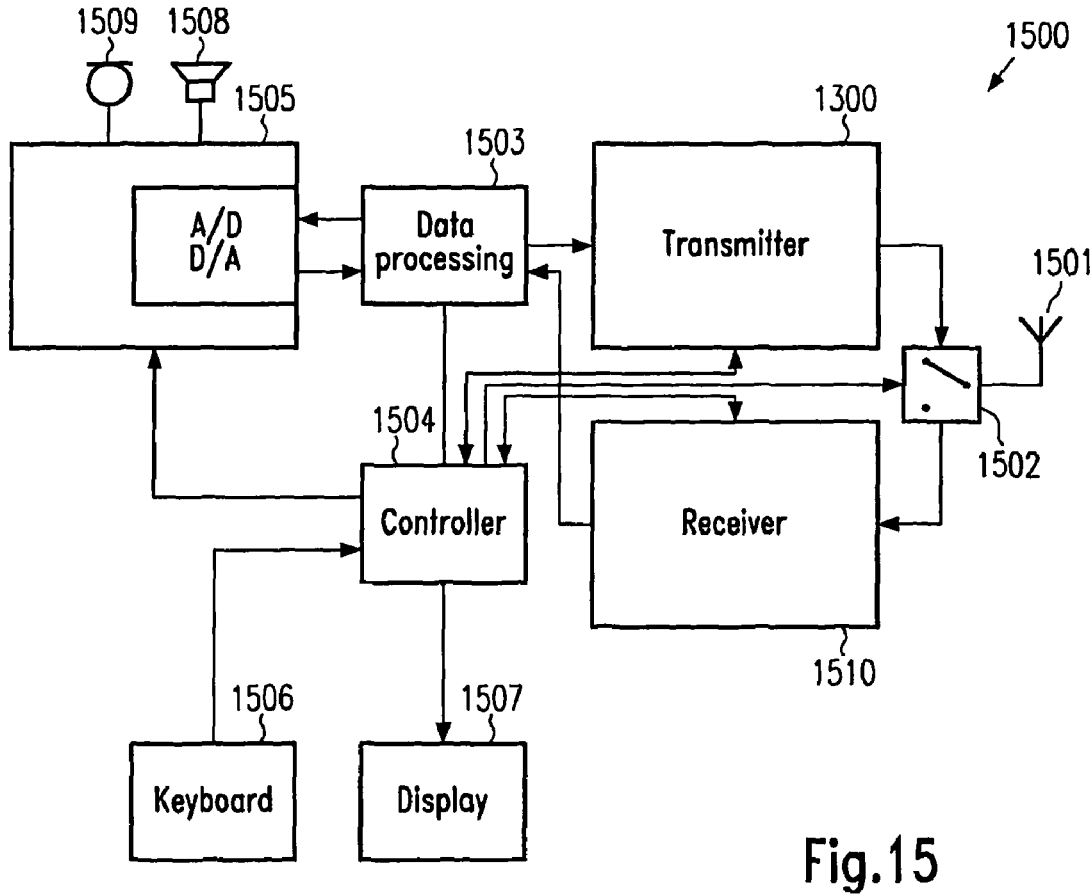
FIG. 15 illustrates an exemplary structure of a mobile station.

A counterpart to base station 1400 might be a mobile station 1500 as shown in FIG. 15. Besides transmitter 1300 and receiver 1510, a mobile station may further comprise antenna 1501, antenna switch 1502, data processing unit 1503 and controller 1504.

Mobile station 1500 might be a mobile phone or a module to be integrated into a portable computer, PDA, vehicle, vending machine or the like. A mobile phone may further comprise mixed signal unit 1505 and a user interface comprising keyboard 1506, display 1507, speaker 1508 and microphone 1509.

A method and a receiver according to the present invention may advantageously improve the reliability of the channel estimation in a digital communication system. A better channel estimation has the advantage of reduced error rates and may provide connection with wireless communication systems in areas of weak coverage, fast fading conditions and other adverse circumstances.

While the invention has been described with respect to the embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

The invention claimed is:

1. A method for transmitting data in a digital communication system, the method comprising:
 a) a first transmission step of transmitting a data word modulated on a carrier according to a first mapping of first concatenated data word values to modulation states; and
 b) at least one further transmission step of transmitting the same data word modulated on a carrier according to at least one further mapping of further concatenated data word values to modulation states, wherein:
 a number of different combined values obtainable, by adding for each of the first and further concatenated data word values, complex values associated with said first concatenated data word value according to said first mapping and further complex values associated with said further concatenated data word values according to said at least one further mapping, is lower than a number of different data word values within said first mapping, and
 said first mapping and said at least one further mapping are obtained from a common super-mapping by pre-pending a leading control word to a data word, wherein the common super-mapping maps concatenated values of a control word and the data word having said leading control word pre-pended thereto to modulation states, and each of the first and the at least one further transmission is associated with a specific value of the control word, resulting in the respective first and further concatenated data word values.

2. The method according to claim 1, wherein said transmitting steps are carried out subsequently on the same transmission channel.

3. The method according to claim 1, wherein said digital communication system comprises a frequency division multiple access component, and said transmitting steps are carried out in different frequency channels.

4. The method according to claim 1, wherein said transmission steps are applied to each transmitted symbol.

5. The method according to claim 1, wherein said further transmission steps are applied to a defined number of data symbols per transmission frame.

6. A non-transitory computer-readable storage medium having stored thereon program instructions that, when executed in a processor of a transmitter of a digital communication system, cause the transmitter to perform the method according to claim 1.

* * * * *